United States Patent [19]

Brandorff et al.

[11] Patent Number: 5,408,084

[45] Date of Patent: Apr. 18, 1995

[54] METHOD AND APPARATUS FOR ILLUMINATION AND IMAGING OF A SURFACE USING 2-D LED ARRAY

[75] Inventors: Alexander Brandorff, New Milford, Conn.; John W. Sussmeier, Wappingers Falls, N.Y.

[73] Assignee: United Parcel Service of America, Inc., Atlanta, Ga.

[21] Appl. No.: 19,220

[22] Filed: Feb. 18, 1993

[51] Int. Cl.[6] ............................................. G06K 7/10
[52] U.S. Cl. ..................................... 250/208; 250/566; 358/472; 235/472
[58] Field of Search ................ 250/208.1, 227.13, 552, 250/553, 557, 559, 571, 566–568; 235/462, 472, 473; 358/473, 482

[56] References Cited

U.S. PATENT DOCUMENTS

| | | | |
|---|---|---|---|
| 3,216,317 | 11/1965 | Nail . | |
| 3,996,476 | 12/1976 | Lazzara | 250/563 |
| 4,286,146 | 8/1981 | Uno et al. | 235/456 |
| 4,335,302 | 6/1982 | Robillard | 235/462 |
| 4,488,679 | 12/1984 | Bockholt et al. | 356/469 |
| 4,500,776 | 2/1985 | Laser | 235/162 |
| 4,603,976 | 8/1986 | Fetzer et al. | 356/402 |
| 4,700,078 | 10/1987 | Mizuno et al. | 250/566 |
| 4,737,653 | 4/1988 | Nakagawa et al. | 250/578 |
| 4,739,159 | 4/1988 | Inokuchi | 250/216 |
| 4,743,773 | 5/1988 | Katana et al. | 250/566 |
| 4,766,300 | 8/1988 | Chadima, Jr. et al. | 235/472 |
| 4,818,847 | 4/1989 | Hara et al. | 235/455 |
| 4,877,949 | 10/1989 | Danielson et al. | 235/462 |
| 4,896,029 | 1/1990 | Chandler et al. | 235/494 |
| 4,947,291 | 8/1990 | McDermott | 362/19 |
| 5,019,699 | 5/1991 | Koenck | 235/472 |
| 5,027,418 | 6/1991 | Ikegaya et al. | 382/8 |
| 5,032,960 | 7/1991 | Katoh | 362/240 |
| 5,046,159 | 9/1991 | Hamanaka | 355/1 |
| 5,081,343 | 1/1992 | Chadima, Jr. et al. | 235/472 |
| 5,227,642 | 7/1994 | Shimizu | 250/566 |
| 5,291,009 | 3/1994 | Roustaei | 235/472 |

FOREIGN PATENT DOCUMENTS

| | | |
|---|---|---|
| 0405965 | 1/1991 | European Pat. Off. . |
| 0524029 | 1/1993 | European Pat. Off. . |
| 1252108 | 11/1971 | United Kingdom . |
| 2018483 | 10/1979 | United Kingdom . |

OTHER PUBLICATIONS

Patent Abstracts of Japan, vol. 15, No. 67 (p. 1167), (Feb. 17, 1991).

*Primary Examiner*—David C. Nelms
*Assistant Examiner*—Stephone B. Allen
*Attorney, Agent, or Firm*—James A. Drobile; William H. Murray; Robert E. Rosenthal

[57] ABSTRACT

An apparatus for illuminating and imaging a surface includes a two-dimensional array of LEDs for providing uniform illumination to the surface, the LEDs being mounted on a planar surface with a centrally defined aperture, and a CCD-based camera with appropriate lensing for obtaining an image of the illuminated surface and providing a signal representative of that obtained image to a processing unit, the CCD-based camera lensing being disposed through the centrally defined aperture in the planar surface of the LED array, and the LED array and CCD-camera lensing being disposed inside an opaque shroud.

15 Claims, 5 Drawing Sheets

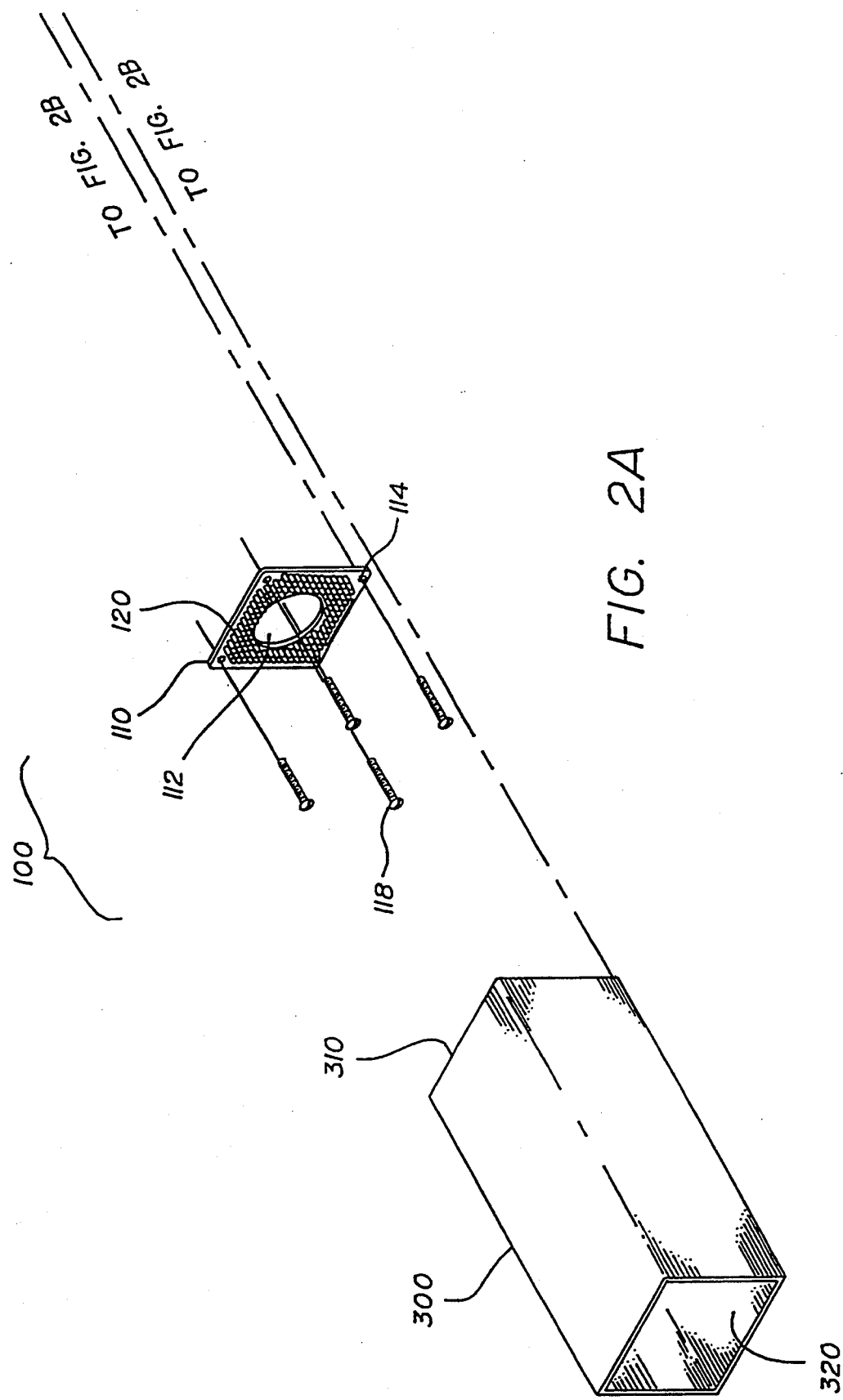

METHOD AND APPARATUS FOR ILLUMINATION AND IMAGING OF A SURFACE USING 2-D LED ARRAY

BACKGROUND OF THE INVENTION

This invention relates to illumination schemes for image capturing devices, particularly devices for obtaining an image of a surface which has coded or alphanumeric information affixed thereon.

Image capturing devices are desirable in the package delivery field, where in-transit parcels bear labels having bar codes printed thereon containing customer shipping information. It would be desirable to obtain images of these labels from the surface of such in-transit parcels. The image of the label would desirably be electronically transmitted to a data processing apparatus where the customer shipping information is retrieved, expediting handling and delivery of the parcel. Retrieval of the shipping information depends heavily on the ability of the image capturing device to obtain a complete and accurate image of the bar code or label affixed to the parcel's surface. Improper lighting, glare and shadows can all reduce the quality of the image obtained and impair the ability to retrieve the shipping information.

To improve image quality, hand-held image capturing devices have been proposed that incorporate some type of internal illumination scheme. The goal of these illumination schemes is to enhance image retrieval by providing controlled illumination to the surface to be imaged, thereby ensuring that the image of the bar code or label obtained is readable by the data processing apparatus. These devices, however, fail to provide readable images because the lighting schemes employed do not produce uniform illumination across the entire surface to be imaged. Frequently, these schemes illuminate certain portions of the surface too intensely, creating "hot spots." When light reflected from such a "hot spot" is focused on a CCD chip, for example, CCD elements will receive more light than their capacity, obliterating or distorting the image of the label or bar code produced by the CCD chip. Alternatively, certain portions of the surface, especially the corners of the bar code or label, may receive light which is insufficient to cause CCD elements to respond, thus creating an image with "shadows." These "shadows" prevent the data processing means from retrieving the customer shipping information from that portion of the image subject to the "shadow." Even if the surface to be imaged is illuminated without severe "hot spots" or "shadows," the difference in distinguishing between the various levels of illumination produced at that surface by these devices needlessly complicates signal processing.

These drawbacks represent a particular problem in obtaining information from a label having a two-dimensional symbology or an alphanumeric label. Such labels typically lack the redundancy present in bar codes. Consequently, information is lost when any portion of the label is improperly illuminated.

An example of this type of illumination scheme is U.S. Pat. No. 5,032,960 entitled "Light Source Device With Arrayed Light Emitting Elements and Manufacturing Therefor," issued to Katoh on Jul. 16, 1991. The Katoh patent discloses a series of light-emitting diodes ("LEDs") arranged linearly on a printed circuit board which, in conjunction with a convergent lens, provides illumination along a line, thus permitting scanning across a surface. It is intended for use in an imaging device such as a copier. The time required for imaging using the device taught in Katoh is accordingly excessive when compared with the requirements of parcel processing.

Accordingly, it is an object of this invention to provide an LED illumination scheme that provides simultaneous uniform illumination across the entire surface of an object to be imaged or scanned.

Further objects and advantages of the invention will become apparent from the detailed description of a preferred embodiment set forth below.

SUMMARY OF THE INVENTION

An illumination and imaging apparatus for obtaining an image of a surface includes a two-dimensional array of LEDs for illuminating the surface and means for obtaining an image of the illuminated surface which provides an output signal representative of the obtained image.

A method of illuminating and imaging a target surface includes the steps of illuminating the target surface by use of a two-dimensional array of LEDs, and obtaining an image of the illuminated target surface and providing an output signal representative of the obtained image.

BRIEF DESCRIPTION OF THE FIGURES

FIGS. 2A and 2B are an exploded isometric view of an apparatus according to the invention.

DETAILED DESCRIPTION OF A PREFERRED EMBODIMENT

Figure 1:
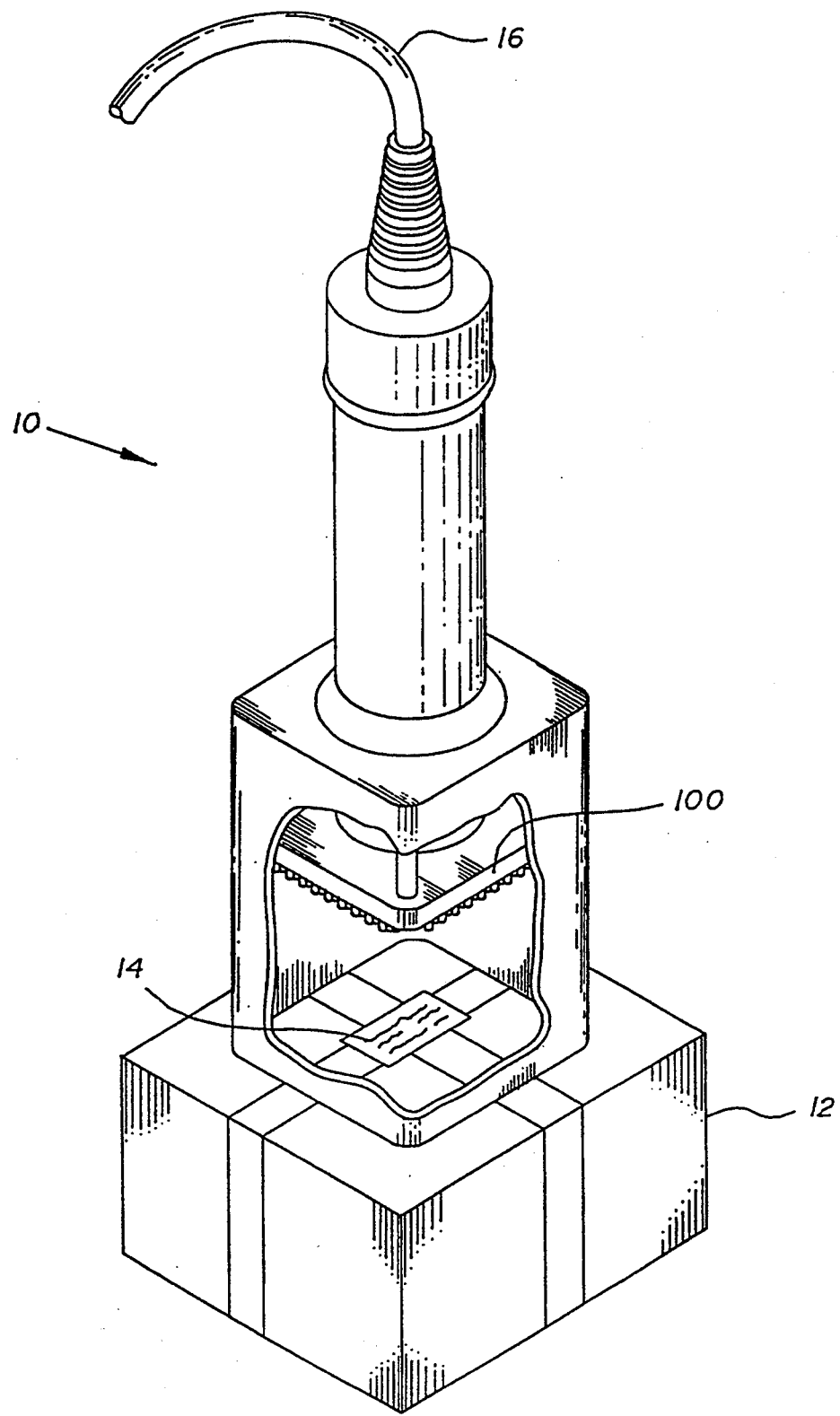
FIG. 1 is an isometric view with partial cut-away of an apparatus according to the invention in use.

Referring to FIG. 1, there is shown a fully-assembled illumination and imaging apparatus 10 according to the invention in use, in partial cut-away. Apparatus 10 is shown in use in obtaining an image of label 14 affixed to a surface of package 12. Apparatus 10 is positioned so as to completely cover label 14. Apparatus 10 has illumination assembly 100. Diffuse light generated by illumination assembly 100 uniformly illuminates label 14 while label 14 is imaged by CCD camera assembly 200 (not shown in FIG. 1) disposed inside apparatus 10. An electronic signal representing the image of label 14 obtained by CCD camera assembly 200 (not shown in FIG. 1) is then transmitted from apparatus 10 to a data processing unit (not shown) external to apparatus 10 through cable 16.

Figure 2B:
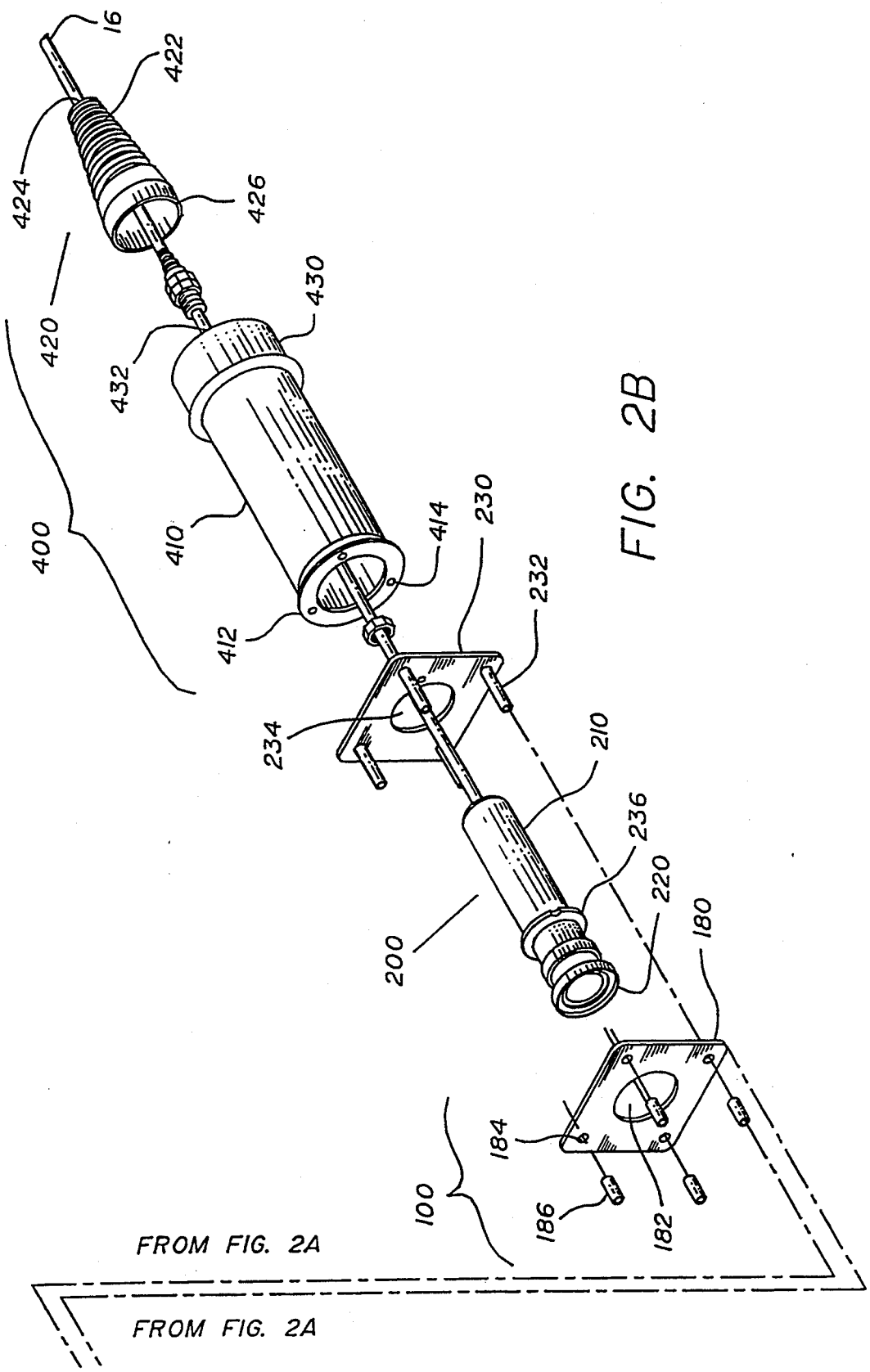

Referring now to FIGS. 2A and 2B, apparatus 10 includes illumination assembly 100, CCD camera assembly 200, shroud 300, and handle assembly 400. Illumination assembly 100 includes LED mounting board 110 and LED trigger board 180. Both LED mounting board 110 and LED trigger board 180 are substantially planar and square in shape, with central circular holes 112 and 182, respectively, disposed therethrough.

Figure 3:
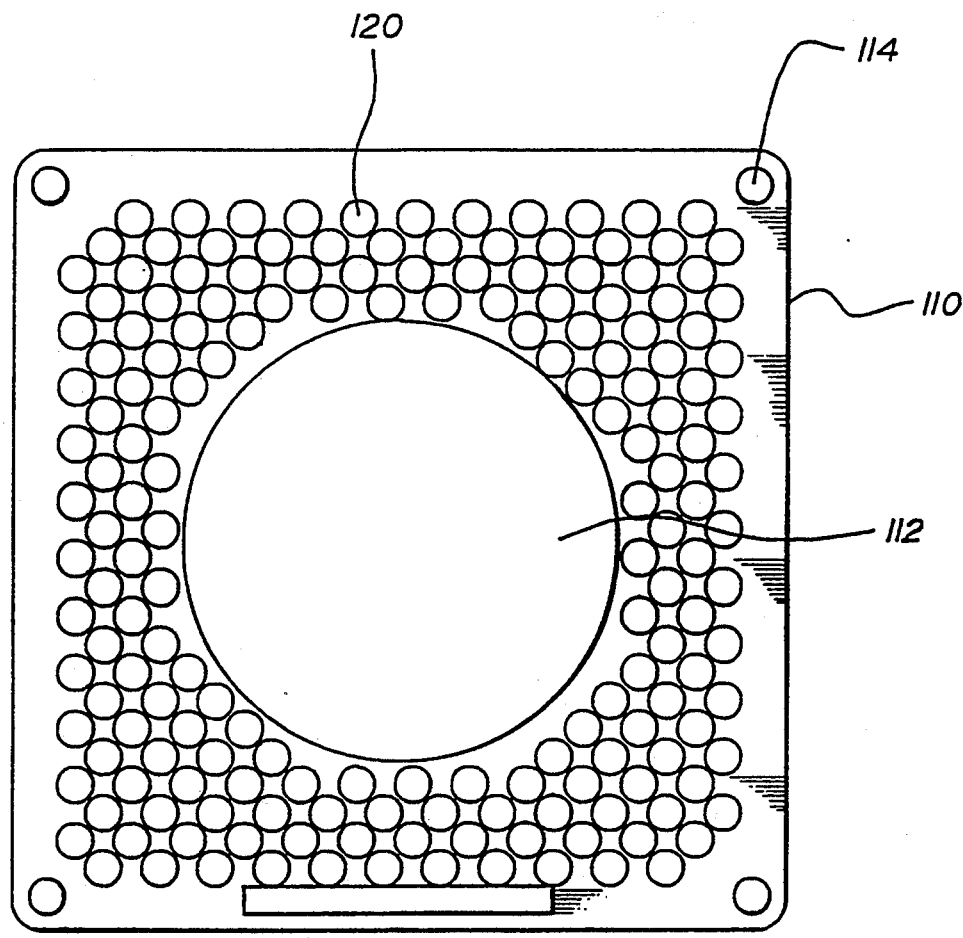
FIG. 3 is a plan view of an LED array according to the invention.

LED mounting board 110 serves as the mounting base for the two-dimensional array of LEDs 120. Referring now to FIG. 3, LEDs 120 are arranged on LED mounting board 110 in a large number of parallel horizontal rows, with equal spacing of LEDs 120 within each row, and the rows equally spaced from one another. Each horizontal row of LEDs 120 is offset by half the center-to-center spacing of the LEDs 120 in the preceding and succeeding horizontal rows. LEDs 120 are mounted on LED mounting board 110 by conventional mounting means.

Figure 4:
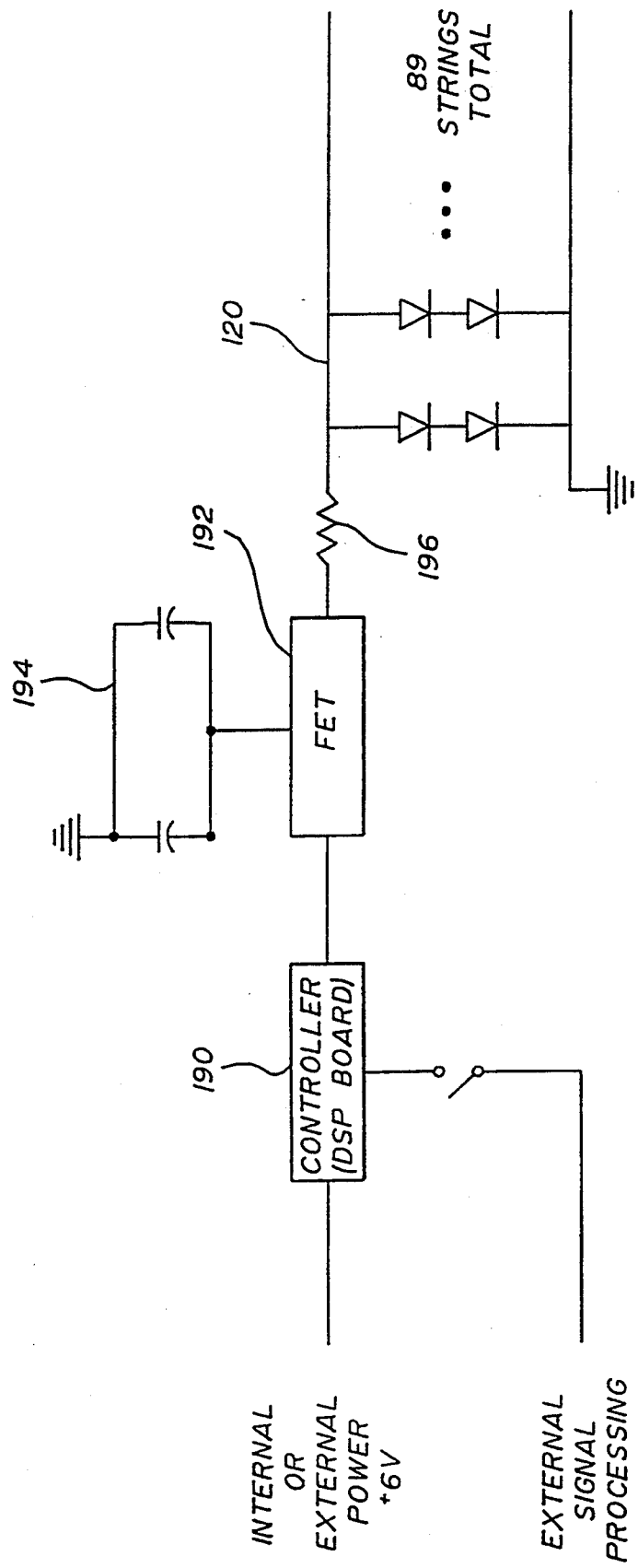
FIG. 4 is a basic circuit diagram for the LED array according to the invention.

LEDs 120 may be electrically connected in the circuit depicted in FIG. 4. Two individual LEDs 120 are connected in series to form a single LED string. Individual LED strings are then connected to each other in parallel, with a current limiting resistor in the circuit between the LED strings and the power source. By way of example only, this embodiment has eighty-nine LED strings connected in parallel constituting the full two-dimensional LED array covering LED mounting board 110. Power is provided to LEDs 120 on LED mounting board 110 by LED trigger board 180. The large number of LEDs, here 178, and their generally equal spacing across LED mounting board 110, provides uniform illumination. The number of LEDs may of course be increased, to the extent permitted by space limitations. The number of LEDs may also be reduced. However, as the number of LEDs is reduced, uniformity of illumination is reduced.

Referring to FIG. 2B, LED trigger board 180 contains the control and power circuitry for LEDs 120 mounted on LED mounting board 110. LED trigger board 180 receives power from either an external source (not shown) via cable 16 or an internal power source (not shown). As depicted on FIG. 4, energy may be stored in one or more capacitors 194 mounted on LED trigger board 180. When apparatus 10 is not being used to obtain images of a surface, field effect transistor 192 allows power to flow only from the external or internal power source (not shown) directly to capacitors 194, allowing capacitors 194 to charge. When a imaging activation signal is received by controller 190, controller 190 sends a signal to field effect transistor 192 to open the circuit between capacitors 194 and LEDs 120. Capacitors 194 thus discharge stored electrical energy through current limiting resistor 196 into LEDs 120 mounted on LED mounting board 110, causing LEDs 120 to flash. At the same time, a data processing unit (not shown) external to apparatus 10 causes CCD camera assembly 200 to obtain an image of the now illuminated target surface.

By way of example only, a working embodiment of illumination assembly 100 will be described in detail. LED mounting board 110 is a square circuit board approximately 2.75 inches by 2.75 inches. LED mounting board 110 has a central circular hole 112 1.54 inches in diameter disposed therethrough, the center being an equidistant 1.375 inches from the outside edges of LED mounting board 110. In each corner, LED mounting board 110 has a hole 114 0.125 inches in diameter disposed therethrough for purposes of attaching LED mounting board 110 to LED trigger board 180 using small standoffs 186 and screws 118. The center of each hole 114 is approximately 0.125 inches from the outside edges of LED mounting board 110.

Each LED is a Hewlett-Packard HLMP-K105 "Red" LED lamp. These LEDs were selected for their excellent energy efficiency. As described above, LEDs 120 are electrically connected into 89 LED strings in parallel, each LED string defined by 2 LEDs 120 in series. LEDs 120 are arranged on the surface of LED mounting board 110 in 24 parallel horizontal rows, with equal spacing of LEDs 120 within each row, and the rows equally spaced from one another. Each horizontal row of LEDs 120s is offset by half the center-to-center spacing of the LEDs 120 in the preceding and succeeding horizontal rows. In a single horizontal row, individual LEDs 120 in that row are separated by 0.2 inches, as measured from the center of one LED 120 to the center of the next LED 120. Each horizontal row of LEDs 120 is separated from the preceding or succeeding horizontal row of LEDs 120 by 0.1 inches, as measured from the center of LEDs 120 in that horizontal row to the center of LEDs 120 in the preceding or succeeding horizontal rows. In the imaging sequence, capacitors 194 provide 7.0 amps of current at 6 volts for one millisecond. As a result, LEDs 120 consume only 0.042 joules of energy per flash while generating enough light to uniformly illuminate the target surface. This low power consumption allows apparatus 10 to operate with an internal power source, such as a rechargeable battery pack, making apparatus 10 a truly portable unit.

LED trigger board 180 is also a square circuit board approximately 2.75 inches by 2.75 inches. LED trigger board 180 has a central circular hole 182 1.54 inches in diameter disposed therethrough, the center being an equidistant 1.375 inches from the outside edges of LED trigger board 180. In each corner, LED trigger board 180 has a hole 184 0.125 inches in diameter disposed therethrough for purposes of accommodating screws 118 to attach LED trigger board 180 to LED mounting board 110 using small standoffs 186, and to attach LED trigger board 180 to mounting board 230 using screws 118 and large standoffs 232. The center of each hole 184 is approximately 0.125 inches from the outside edges of LED trigger board 180. Capacitors 194, field effect transistor 192 and current limiting resistor 196 are mounted on LED trigger board 180. Capacitors 194 are 2 Nichicon 4700 uf capacitors, part number URS1A472-MRA. These capacitors were selected for their large storage capacity and small physical size. By way of example only, current limiting resistor 196 may be a single 0.25 ohm resistor, or may be a string of four 1 ohm resistors connected in parallel.

Referring again to FIG. 2B, CCD camera assembly 200 is the means by which apparatus 10 obtains images of the illuminated target surface. CCD camera assembly 200 includes CCD camera 210, camera lens 220 and mounting board 230. CCD camera 210 contains the CCD imaging elements (not shown) and is connected to a data processing unit (not shown) external to apparatus 10 via cable 16. Camera lens 220 focuses the surface to be imaged on the CCD imaging elements (not shown) disposed inside CCD camera 210.

Illumination assembly 100 and CCD camera assembly 200 are assembled together for insertion and mounting in shroud 300. CCD camera 210 and camera lens 220 are disposed through central circular hole 234 in mounting board 230, with camera lens 220 extending downward from mounting board 230 through central circular holes 112 and 182 in LED mounting board 110 and LED trigger board 180 so that a clear view of the target surface is obtained. CCD camera 210 and camera lens 220 are attached to mounting board 230 by attachment ring 236. Once CCD camera 210 and camera lens 220 are attached to mounting board 230 and camera lens 220 is disposed through central circular holes 112 and 182 in LED mounting board 110 and LED trigger board 180, screws 118 are disposed through holes 114 in LED mounting board 110, through small standoffs 186, through holes 184 in LED trigger board 180 and into large standoffs 232 attached to mounting board 230. When screws 118 are tightened, illumination assembly 100 components are rigidly attached to CCD camera assembly 200, thus forming one single unit for insertion and mounting in shroud 300.

Because camera lens 220 is mounted inside apparatus 10 at a fixed distance from the lower edge of shroud 300, and hence a fixed distance above the target surface, no adjustments are required to obtain a clear image of the target surface during the imaging process. Proper focusing of CCD camera 210 is achieved by simply placing apparatus 10 on the surface to be imaged. By way of example only, the CCD-based camera may be a Pulnix TM-7X camera with a TAMRON 6.5 mm lens.

In an alternative embodiment, a narrow bandpass filter and/or a polarizer/analyzer may be employed to enhance the clarity of the image obtained from the target surface. In this alternative embodiment, the bandpass filter or the analyzer may be a cap type assembly which fits securely over camera lens 220, or may be fabricated in such a way as to integrally connect with camera lens 220. The polarizer would typically be a thin film disposed downward of LED mounting board 110, with a hole therethrough for camera lens 220. The bandpass filter or analyzer would be disposed between camera lens 220 and the target surface, so that light reflected back from the target surface passes through the bandpass filter or analyzer before reaching camera lens 220.

The narrow bandpass filter allows only light in a selected region of the spectrum in which the LEDs emit to reach the CCD imaging elements, thereby eliminating the image distorting effects of radiated light in the infrared region of the spectrum and of ambient illumination. By polarizing light transmitted to the target surface in a first direction, and polarizing light reflected back from the target surface in a second direction, the polarizer/analyzer eliminates substantially all glare caused by specular light reflecting off the target surface. This virtually eliminates any glare induced "hot spots" on the image obtained by CCD camera assembly 200.

Shroud 300 has a generally vertical opaque sidewall, and may be square in section. The top 310 of shroud 300 is completely open to receive the assembled components of illumination assembly 100 and CCD camera assembly 200. Mounting board 230 of CCD camera assembly 200, with attached illumination assembly 100, fits snugly inside the opening in top 310 of shroud 300 and is attached to shroud 300 using conventional mounting means. Shroud 300 also has an open base 320 to allow shroud 300 to completely cover a surface to be imaged, blocking out substantially all sources of light external to apparatus 10 while allowing light radiating from illumination assembly 100 to uniformly illuminate the surface to be imaged.

Shroud 300 is made of an opaque material, such as molded plastic. The internal surfaces of shroud 300 below illumination assembly 100 may be coated with a light-reflective material, such as a thin aluminum film. This coating will enhance the illumination intensity and increase the illumination uniformity on the surface to be imaged. Preferably, the entire internal surface, or substantially the entire internal surface of shroud 300 below illumination assembly 100 is light reflective.

Handle assembly 400 includes main handle 410, strain relief 420, and switch 430. Main handle 410 serves as a conduit for cable 16, an enclosure for CCD camera 210, and a handgrip for apparatus 10. Main handle 410 is a hollow, rigid metal tube with a foam rubber grip surrounding its outer circumference. The foam rubber grip allows for easy handling of apparatus 10 during operation. CCD camera 210 is disposed inside main handle 410, and cable 16 is routed through central circular opening 432 in switch 430 and is disposed inside main handle 410, attaching to the top of CCD camera 210.

A circular mounting ring 412 defines the bottom portion of main handle 410. Handle assembly 400 attaches to CCD camera assembly 200 by disposing screws through holes 414 in mounting ring 412 and into holes (not shown) in the upper side of mounting board 230.

Strain relief 420 defines the top of handle assembly 400. Strain relief 420 is preferably made of flexible plastic molded in a helical "pigtail" shape 422 which is disposed around cable 16. Cable 16 is routed through hole 424 in the top of strain relief 420. The bottom lip 426 of strain relief 420 is preferably made of rigid plastic and fits snugly inside the central circular opening 432 in switch 430. In operation, strain relief 420 flexes back and forth restricting the lateral movement of cable 16, permitting the operator to move apparatus 10 without damaging or severing cable 16.

Switch 430 is mounted on the top of main handle 410 by conventional mounting means. Switch 430 may be a conventional omnidirectional switch. Switch 430 wiring is routed internally to controller 190. A central circular hole 432 is defined in the top of switch 430 to accommodate bottom lip 426 of strain relief 420 and to internally route cable 16.

Referring to FIG. 4, during operation of apparatus 10, switch 430 serves as the means for activating the illumination and imaging sequence of apparatus 10. When switch 430 is activated, an activation signal from switch 430 is sent to controller 190. Once the activation signal is received, controller 190 sends a signal to field effect transistor 192 to permit current to flow from capacitors 194 to LEDs 120 causing LEDs 120 to flash, while simultaneously a data processing unit external to apparatus 10 triggers CCD camera assembly 200 to take an image of the illuminated target surface.

In operation, an operator positions apparatus 10 over the surface to be imaged so that shroud 300 covers as much of the surface as possible. To begin the imaging sequence, the operator activates switch 430. Switch 430 sends an activation signal to controller 190. The activation signal starts a 1 millisecond timing circuit in controller 190. At the same moment the timing circuit is activated, controller 190 sends a signal to field effect transistor 192 to open the flow of power from capacitors 194 to LEDs 120 mounted on LED mounting board 110. Capacitors 194 discharge through current limiting resistor 196 into LEDs 120, causing LEDs 120 to flash. A data processing unit external to apparatus 10 also receives the activation signal via cable 16 and signals CCD camera assembly 200 to obtain an image of the now illuminated target surface. CCD camera assembly 200 takes the image, which is transferred back to the external data processing unit via cable 16. The entire imaging sequence is completed before the 1 millisecond timing circuit in controller 190 expires. Once the timing circuit expires, controller 190 sends a second signal to field effect transistor 192 to shut off the flow of power from capacitors 194 to LEDs 120, reestablishing the flow of power from the external or internal power source to capacitors 194, allowing capacitors 194 to recharge for the next imaging sequence.

By using a two-dimensional array of LEDs affixed to a surface, the present invention permits diffuse illumination radiating from the LEDs to reach a surface to be imaged without "hot spots" or "shadows," creating uniform illumination across the entire surface. This allows the imaging apparatus to obtain a complete and accurate image of the surface for further data processing. The LEDs may be selected for extreme energy efficiency, resulting in low power consumption with no degradation in illumination. The device can accordingly be operated using only a rechargeable battery pack, making the device a truly portable unit.

It will be appreciated that there are considerable variations that can be accomplished in a method and apparatus of the invention without departing from its scope. As a result, although a preferred embodiment of an apparatus of the invention has been described above, it is emphasized that the invention is not limited to a preferred embodiment and there exist other alternative embodiments that are fully encompassed within the invention's scope, which is limited only by the scope of the appended claims.

What is claimed is:

1. An illumination and imaging apparatus, comprising:
    (a) a two-dimensional array of LEDs for illuminating a surface;
    (b) means for obtaining an image of the illuminated surface and providing an output signal representative of said obtained image; and
    (c) a handle, said LED array and said image obtaining means being mounted on said handle for positioning by hand;
    wherein said array is supported on a planar surface, an aperture being defined centrally through said planar surface.

2. The apparatus of claim 1, wherein said image obtaining means is a CCD-based camera.

3. The apparatus of claim 1, wherein said image obtaining means is a CCD-based camera having lensing, said lensing being disposed through the aperture defined in said planar surface.

4. The apparatus of claim 1, wherein said LEDs are mounted on said planar surface in a series of horizontal rows, with equal spacing between said LEDs within each said horizontal row, and said horizontal rows being equally spaced from one another.

5. The apparatus of claim 4, wherein each said horizontal row is offset by half the center-to-center spacing of said LEDs in the preceding and succeeding horizontal rows.

6. An illumination and imaging apparatus, comprising:
    (a) a two-dimensional array of LEDs for illuminating a surface;
    (b) means for obtaining an image of the illuminated surface and providing an output signal representative of said obtained image, said image obtaining means comprising lensing;
    (c) a generally sleeve-like shroud having a generally vertical opaque wall, defining a lower opening;
    said array and said lensing being mounted inside an upper portion of said shroud.

7. The apparatus of claim 6, wherein said lower opening is defined by a lower edge of said vertical shroud wall, said edge lying substantially in a plane.

8. The apparatus of claim 6, wherein substantially all of the interior surface of said shroud below said array is reflective of light emitted by said array.

9. A method for illuminating and imaging a target surface, comprising the steps of:
    (a) manually positioning a two-dimensional array of LEDs in a selected position with respect to the target surface, said array being supported on a planar surface with a centrally defined aperture disposed therethrough;
    (b) illuminating the target surface by use of said two-dimensional array of LEDs; and
    (c) obtaining an image of the illuminated target surface and providing an output signal representative of the obtained image.

10. The method of claim 9, wherein said step of image obtaining comprises using a CCD-based camera.

11. The method of claim 10, wherein said LEDs are mounted on said planar surface in a series of horizontal rows, with equal spacing between said LEDs within each said horizontal row, and said horizontal rows being equally spaced from one another.

12. The method of claim 11, wherein each said horizontal row is offset by half the center-to-center spacing of said LEDs in the preceding and succeeding horizontal rows.

13. The method of claim 9, wherein said step of image obtaining comprises using a CCD-based camera, and wherein said CCD-based camera has lensing, said lensing being disposed through said aperture in said planar surface to a predetermined position with respect to the surface.

14. A method for illuminating and imaging a target surface, comprising the steps of:
    (a) providing a two-dimensional array of LEDs and camera lensing inside the upper portion of a generally sleeve-like shroud having a generally vertical opaque wall, the lower edge of said generally vertical opaque wall defining a lower opening, said edge lying substantially in a plane;
    (b) illuminating the target surface by use of said LED array; and
    (c) obtaining an image of the illuminated target surface, employing said lensing, and providing an output signal representative of the obtained image.

15. The method of claim 14, further comprising the step of manually placing said edge in contact with the target surface and maintaining said edge in contact with the target surface during said steps (b) and (c).

* * * * *